United States Patent [19]
Dobrin et al.

[11] Patent Number: 5,172,652
[45] Date of Patent: Dec. 22, 1992

[54] ABSORBENT PET WASTE CONTAINER

[76] Inventors: Robert J. Dobrin; Riza Chase-Gilpin, both of 3850 Coconut Creek Pkwy., Coconut Creek, Fla. 33066

[21] Appl. No.: 706,390

[22] Filed: May 28, 1991

[51] Int. Cl.$^5$ .............................................. A01K 1/01
[52] U.S. Cl. ................................ 119/165; 229/2.5 R; 119/171; 119/169
[58] Field of Search ............... 119/171, 172, 173, 165, 119/166, 167, 168, 169, 170; 229/2.5 R

[56] References Cited

U.S. PATENT DOCUMENTS

| | | | |
|---|---|---|---|
| 3,154,052 | 10/1964 | Sweeney | 119/1 |
| 3,886,901 | 6/1975 | Zeitter | 229/14 B |
| 4,188,055 | 2/1980 | Green | 15/257.6 |
| 4,441,451 | 4/1984 | Neal | 119/1 |
| 4,541,360 | 9/1985 | Higgins et al. | 119/1 |
| 4,553,671 | 11/1985 | Cheesman | 206/611 |
| 4,628,863 | 12/1986 | Eichenauer | 119/1 |
| 4,706,606 | 11/1987 | Coppola | 119/165 |
| 4,779,567 | 10/1988 | Smith | 119/1 |
| 4,788,935 | 12/1988 | Bella et al. | 119/1 |
| 4,846,105 | 7/1989 | Caldwell | 119/1 |
| 5,080,043 | 1/1992 | Fields | 383/33 |

FOREIGN PATENT DOCUMENTS

| | | | |
|---|---|---|---|
| 334252 | 9/1989 | European Pat. Off. | 119/165 |
| 2737617 | 3/1979 | Fed. Rep. of Germany | 119/168 |
| 2482416 | 11/1981 | France | 119/165 |
| 2593670 | 8/1987 | France | 119/165 |
| 2632818 | 12/1989 | France | 119/165 |

Primary Examiner—John G. Weiss
Attorney, Agent, or Firm—Oltman and Flynn

[57] ABSTRACT

A vessel for containing pet waste and litter material is formed of recycled paper for absorbing liquids and preventing odor. The vessel preferably has essentially vertical side members, having upper edges, and an essentially horizontal bottom member, interconnected in a sealing relationship. The upper edges of the side members preferably tilt out from the interior of the vessel. A horizontal lip preferably projects from the upper edges of the side members, outside the vessel. A cover member is optionally provided, which is joined to the side member upper edges to cover and seal the vessel. The cover member preferably has a middle area, defined by perforations or surface scoring, which can be torn out along the perforations or surface scoring to expose the interior of the vessel so that the remaining portion of the cover member forms an inwardly projecting, horizontal lip for retaining the litter material. The vessel may be impregnated with an antibacterial agent, a drying agent and a scent.

8 Claims, 2 Drawing Sheets

ABSORBENT PET WASTE CONTAINER

BACKGROUND OF THE INVENTION

1. Field of the Invention

The present invention relates generally to the field of waste containers lined with pet litter, and more specifically to a disposable waste container which absorbs liquids to prevent fermentation and odor, and has a cover with a middle section surrounded by perforations which tears away to leave a litter retaining lip.

2. Description of the Prior Art

Probably since the time people began bringing pets into their homes, and particularly cats, various forms of collection containers have been developed in which pets can bury their waste. These containers were probably first lined with soil and later with various types of absorbent litter.

One such container is disclosed in Neal, U.S. Pat. No. 4,441,451, issued on Apr. 10, 1984. Neal teaches a litter box apparently formed of paper or cardboard and folded together so that it has multiple layers to seal in moisture. Although Neal acknowledges the need for an absorbent box material, Neal teaches one that is "moisture proof." Thus, moisture not absorbed by the litter simply stands and ferments, causing odor. This shortens the useful life of the box, necessitating the inconvenience and expense of frequent replacement. Also, the litter can easily be spilled over the sides of the box while the cat is digging.

Another type of litter box is that of Cheesman, U.S. Pat. No. 4,553,671, issued on Nov. 19, 1985. Cheesman discloses a paperboard box having a litter containing compartment in its lower portion. The compartment is initially sealed under a paper cover. The center of the cover is torn out along perforations to expose the litter and to provide a retaining lip over the litter. A problem with Cheesman, like Neal, is that the box material is only slightly absorbent at most. In fact, Cheesman prefers a waterproof material. Thus liquids can remain and ferment. Another problem is that the retaining lip is near the bottom of the box. This limits the quantity of litter which can be retained in the box which in turn limits the useful life of the box.

Higgins, U.S. Pat. No. 4,541,360, issued on Sep. 17, 1985, includes a lower box member and a cover member which fits over the lower box member. To use the box, the middle of the cover member is torn out along perforations. This leaves an inwardly directed lip to retain litter. A problem with Higgins is that two boxes are actually required to create the retaining lip feature, one inverted and fit over the other. This duplication in materials also doubles the cost. Also, the material is not substantially absorbent, so the fermentation and odor problems are again presented.

Another variation is disclosed in Caldwell, U.S. Pat. No. 4,846,105, issued on Jul. 11, 1989. The Caldwell container is a cardboard box with top flaps that are opened and pointed upward. A rigid collar member is fitted around the flaps. The collar member is shaped to cause the tops of the flaps to converge and help retain scattered litter. A problem with Caldwell is that its cost not only includes the disposable box, but the reusable collar member as well. The collar member could become soiled with waste and, since it is reused, would have to be cleaned. Also, the cardboard box material is only marginally absorbent.

Elchenauer, U.S. Pat. No. 4,628,863, issued on Dec. 16, 1986, teaches a disposable litter box which folds from a closed container into an open box. When opened, Elchenauer is essentially a conventional litter box. Since Elchenauer is stated to be made of waterproofed cardboard, it has no absorbing ability. Also, no provision is made to prevent litter from spilling over the sides.

Another configuration is disclosed in Smith, U.S. Pat. No. 4,779,567, issued on Oct. 25, 1988. Smith includes a box and cover joined by hinges at one edge and having a handle at the opposite edge. Thus, Smith looks essentially like a suitcase. A litter bag is placed inside Smith and split open. The walls of Smith are described as moisture-resistant rather than as absorbent. Thus the problem of fermentation and odor remain. And again, no provision is made for keeping litter from scattering over the sides of the box.

Bella, U.S. Pat. No. 4,788,935, issued on Dec. 6, 1988, teaches a paperboard box structure contained within a bag. One wall of Bella remains exposed and has an entrance port for the cat. Bella thus contains odors within the box to some extent. A problem with Bella is that odors are concentrated within the box rather than absorbed. This may initially benefit humans, but drive the cat to defecate elsewhere. Also, litter can readily spill through the cat port when the cat digs and scatters it.

Zeitter, U.S. Pat. No. 3,886,901, issued on Jun. 3, 1975, discloses a box prefilled with litter which unfolds from a compact configuration. When unfolded for use, however, Zeitter is simply a conventional litter box. The box material is only slightly absorbent, and has no provision for retaining litter against scattering over its sides.

Much the same can be said of Sweeney, U.S. Pat. No. 3,154,052, issued on Oct. 27, 1964. Sweeney teaches a box which folds over itself to form a closed, compact container. Yet, like Zeitter, Sweeney becomes a conventional litter box when opened for use. The box is "moisture-resistant" rather than absorbent. Litter is not retained against spilling over the sides.

It is thus an object of the present invention to provide a pet litter box which absorbs liquid waste and thereby prevents fermentation and odor.

It is another object of the present invention to provide a pet litter box which retains litter against spilling over its sides when disturbed, without the addition of costly box structure.

It is still another object of the present invention to provide a pet litter box which is inexpensive, simple in design and easy to prepare for use.

It is finally an object of the present invention to provide a pet litter box which is constructed of recycled materials and thus benefits the environment.

SUMMARY OF THE INVENTION

The present invention accomplishes the above-stated objectives, as well as others, as may be determined by a fair reading and interpretation of the entire specification.

A vessel for containing pet waste and litter material is provided, which is formed of recycled paper for absorbing liquids and preventing odor. This vessel preferably has at least one essentially vertical side member, having an upper edge, and an essentially horizontal bottom member, interconnected in a sealing relationship. The upper edge of the at least one side member preferably tilts out from the interior of the vessel. At least one horizontal lip preferably projects from the upper edge of the at least one side member, outside the vessel. A cover member is optionally provided, which is joined to the upper edge of the at least one side member to cover and seal the vessel. The cover member preferably has a middle area, defined by perforations or surface scoring, which can be torn out along the perforations or surface scoring to expose the interior of the vessel so that the remaining portion of the cover member forms an inwardly projecting, horizontal lip for retaining the litter material. The vessel may be impregnated with an antibacterial agent, a drying agent and a scent.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
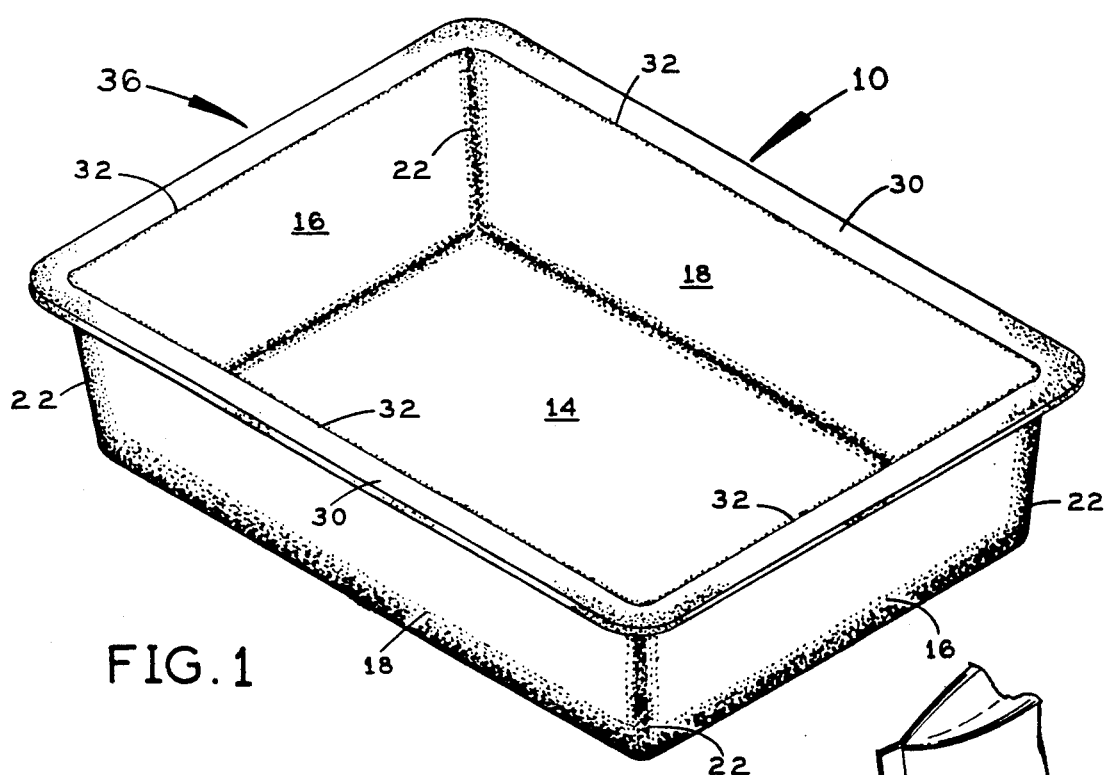
FIG. 1 is a perspective view of the preferred embodiment of the inventive waste container without the cover sheet.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

PREFERRED EMBODIMENT

Figure 2:
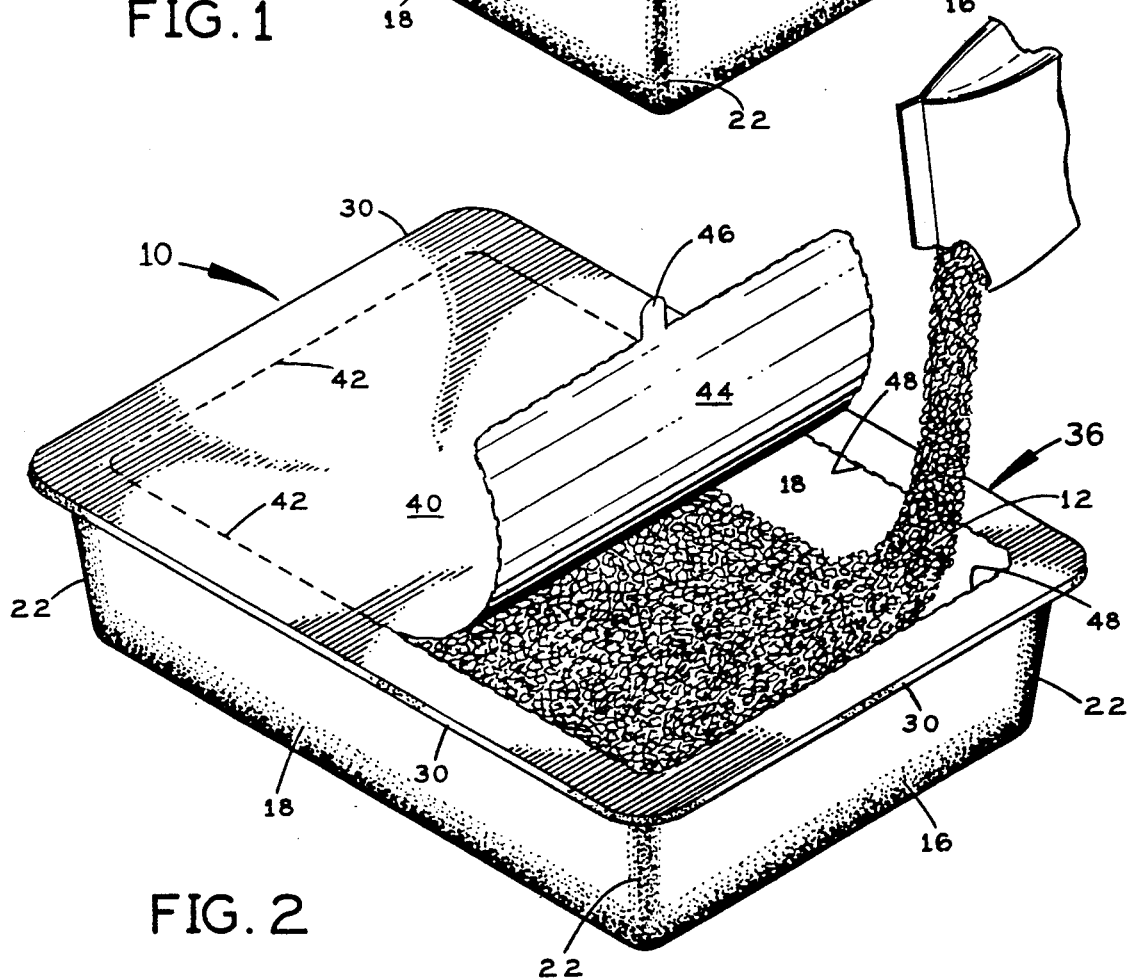
FIG. 2 is a perspective view of the preferred embodiment with the center section of the cover sheet partially torn away.

Referring to FIGS. 1 and 2, a box 10 for pet litter 12 is disclosed which is formed of a recycled paper material and is disposable. Refuse paper such as old newspapers or cuttings from a printer's shop floor may be used. Since the paper would normally be discarded, it is a low-cost material and its reuse benefits the environment. The paper is soaked in liquids typically used in recycling and is mixed with a binder. This mixture is placed in a mold and the liquids drained off; then it is allowed to dry. The resulting recycled paper material is fibrous and retains its shape, usually has a rough texture, and is highly absorbent.

A litter box 10 formed of this recycled material absorbs most or all liquids from pet waste. The prevents the waste from fermenting and causing odor. This absorbent effect lengthens the life of the litter 12 by fifty percent to as much as one hundred percent. For example, if litter 12 would normally last about two days, a box 10 formed of this recycled paper material will increase the life of the litter 12 to about five days. If it would normally last four days, it will last about seven days. This substantial increase in useful life of the litter 12 reduces cost and the inconvenience of replacement.

It is preferred that the recycled material be impregnated with an antibacterial agent and with a drying agent. These can further prevent odor and extend useful life. A pleasant scent may optionally be impregnated in the material as well.

Figure 3:
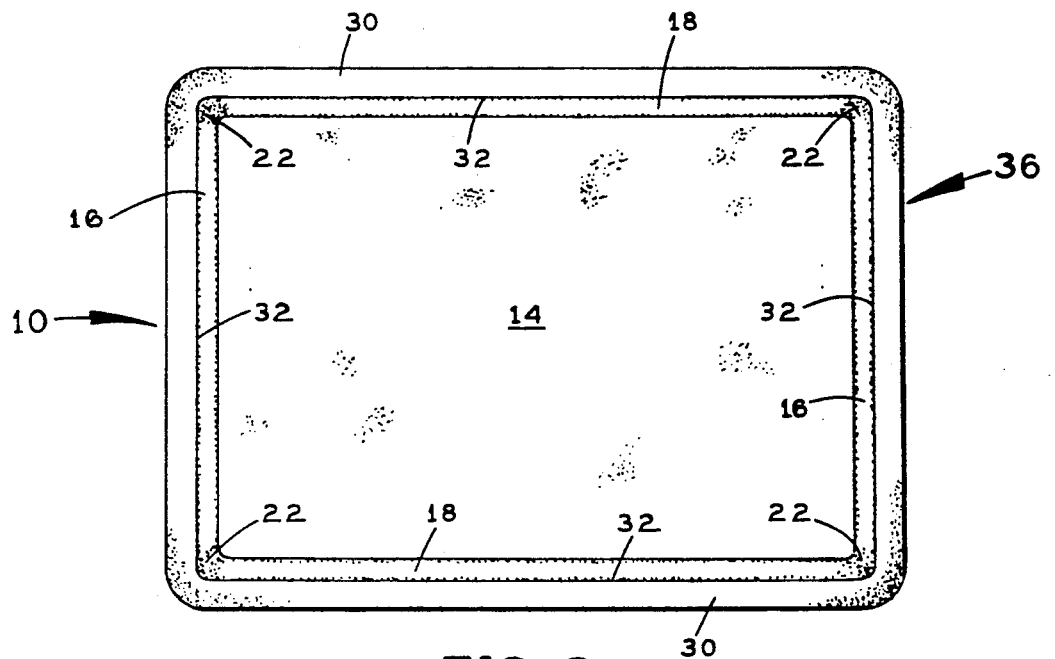
FIG. 3 is a top view of the preferred embodiment, illustrating the preferred side contours.

Box 10 may take a wide variety of shapes and sizes. The preferred configuration of box 10 has a bottom panel 14, two short side panels 16 and two long side panels 18. See FIGS. 1 and 3. Opposing panels 16 and opposing panels 18 are essentially parallel to each other and joined by curved corner panels 22. Although referred to separately, these panels are merely segments of the molded, unified whole.

Figure 4:
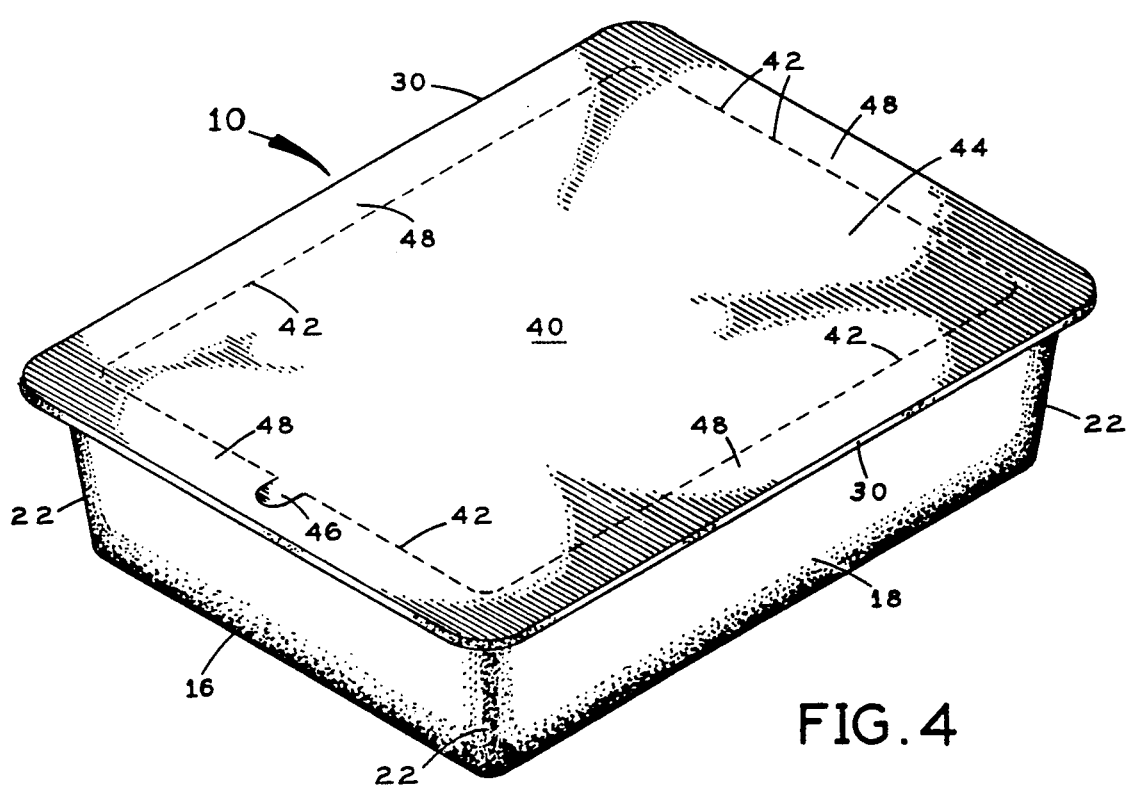
FIG. 4 is a perspective view of the preferred embodiment with the cover sheet in place.

A horizontal lip 30 preferably extends from the upper edges 32 of side panels 16 and 18 and corner panels 22 around the outside of box 10. Lip 30 is formed with the rest of box 10 during the molding process. The width of lip 30 is preferably between one quarter and one half inch. A cover sheet 40 formed of paper or plastic preferably covers the open top 36 of box 10 and is glued or otherwise attached to lip 30. See FIG. 4. A perforation 42 extends around sheet 40 about one inch inside lip 30, defining a section 44 which can be torn out. To initiate tearing along perforation 42, a tab 46 extends from section 44 for grasping between the thumb and finger.

Section 44 is pulled and lifted away when box 10 is to be used. See FIG. 2. The removal of section 44 leaves an inner lip 48 of cover sheet 40 material. Then pet litter 12 is poured into box 10. When the pet digs through litter 12, or box 10 is bumped, lip 48 blocks and retains litter 12 particles sliding over side panels 16 and 18.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A vessel for containing pet waste and litter material, comprising:
    recycled paper for absorbing liquids and odor;
    said vessel having at least one essentially vertical side member, having an upper edge;
    and an essentially horizontal bottom member, interconnected in a sealing relationship and made of said recycled paper;
    said vessel being impregnated with an antibacterial agent.

2. A vessel as in claim 1, wherein the upper edge of the at least one side member tilts out from the interior of the vessel.

3. A vessel as in claim 1, wherein at least one horizontal lip projects from the upper edge of the at least one side member, outside the vessel.

4. A vessel as in claim 1, additionally comprising:
    a cover member which is joined to the upper edge of the at least one side member and covers and seals the vessel.

5. A vessel as in claim 1, wherein the vessel is impregnated with a drying agent.

6. A vessel as in claim 1, wherein the vessel is impregnated with a scant.

7. A vessel as in claim 4, wherein the cover member comprises:
a middle area, defined by perforations, which can be torn out along the perforations to expose the interior of the vessel so that the remaining portion of the cover member forms an inwardly projecting, horizontal lip for retaining the litter material.

8. A vessel as in claim 4, wherein the cover member comprises:
a middle area, defined by surface scoring, which can be torn out along the surface scoring to expose the interior of the vessel so that the remaining portion of the cover member forms an inwardly projecting, horizontal lip for retaining the litter material.

* * * * *